May 7, 1968 G. F. VON TIESENHAUSEN 3,381,778
ENERGY ABSORBING DEVICE
Filed Nov. 4, 1966 3 Sheets-Sheet 2

INVENTOR
GEORG F. VON TIESENHAUSEN
BY
Charles C. Wells
ATTORNEYS

United States Patent Office 3,381,778
Patented May 7, 1968

3,381,778
ENERGY ABSORBING DEVICE
Georg F. von Tiesenhausen, Huntsville, Ala., assignor to the United States of America as represented by the Administrator of the National Aeronautics and Space Administration
Filed Nov. 4, 1966, Ser. No. 592,680
1 Claim. (Cl. 188—1)

ABSTRACT OF THE DISCLOSURE

A nonreuseable energy absorbing device having a ring member with a plurality of recesses formed therein and cutting members and a guide member mounted in each recess. A sleeve is slidably mounted on each guide member such that the sleeve can be cut into strips and the strips deformed so as to absorb energy. Each sleeve has longitudinal calibration grooves formed therein that are in alignment with a cutting member so that groove depth influences the cutting force required. A second ring member has one end of each sleeve attached thereto.

---

The invention described herein was made by an employee of the United States Government and may be manufactured and used by or for the Government for the governmental purposes without the payment of any royalties thereon or therefor.

This invention relates to a kinetic energy absorbing device of a nonreuseable type wherein at least a part of the device is deformed to an extent that it is no longer useable. More particularly, this invention relates to a shock absorbing device for a space vehicle employing the shear and deformation of a metal member to absorb the energy of an impact load generated upon landing of the vehicle.

The advent of the space program has generated a need for special purpose shock absorbing devices for use on space vehicles, either manned or unmanned, which will be landing on the moon and other extra terrestrial surfaces. Present planning for the final phase of the landing sequence in proposed lunar landings, for example, is a free fall to impact on the lunar surface following a braking stage that achieves a full stop a short distance above the lunar surface.

A shock absorber for this application must be relatively simple in operation and structure to assure complete reliability under the very severe and somewhat unpredictable environment in which it will be used. In addition, the design of such a shock absorber is controlled by the weight and size limitations imposed on any component of a space vehicle and thus the length and weight of the shock absorber must be minimized. Further, a shock absorbing device intended for use in the landing gear of a space vehicle must absorb the landing impact with a minimum of vehicle rebound and it must be capable of calibration within required tolerances.

It is apparent from the foregoing discussion of limitations and conditions present in the design of a shock absorber for a space vehicle that an elastic shock absorber is not satisfactory due to the rebounding force of such a device. Hydraulic shock absorbers have been developed to a point where they are nearly perfect, i.e., provide a uniform retarding force over the entire length of their stroke, but these are relatively massive and very complex when designed to withstand a space environment. Various types of other energy absorbing devices have been devised that dissipate energy in fragmenting, deforming or otherwise destroying metal structures such as cylinders, wires or diaphragms. It has also been proposed that vented gas bags be employed as a very light weight shock absorbing device. These schemes have the disadvantages of excessive length of shock absorber when wires or diaphragms are used; and that pieces of a fragmented shock absorber, or gas vented from a gas bag shock absorber, contaminate the landing area. Contamination of the landing area cannot be tolerated, particularly when an experiment is to be conducted in the landing area.

The present invention provides an energy absorbing device that overcomes the above mentioned disadvantages and provides a relatively lightweight, nonrebounding and reliable shock absorber device. This is accomplished, briefly, by combining the shear and deformation of metal to dissipate energy and thus absorb the landing shock of a space vehicle. The invention includes a grooved tubular member or sleeve mounted on a contact member having a recess formed therein and cutting edges that engage one end of the tubular sleeve. The contact plate is the component of the shock absorber that initially engages a landing surface and the weight of the space vehicle drives the tubular member into the contact plate where it is cut into strips along the precalibrated grooves by the cutting members and shaped into coils by the formed recess in the contact plate. The thickness of the tubular member and the depth of grooves determines the amount of energy the invention can absorb.

It is apparent from the foregoing that the invention is a new and novel energy absorbing device.

It is therefore an object of this invention to provide an energy absorbing device utilizing both shear and deformation of a member to dissipate energy.

Another object of this invention is to provide a shock absorber that is lightweight, of minimum length and rugged construction, easy to calibrate, and sufficiently simple to provide the reliability required in space vehicles.

These and other objects and attendant advantages of the invention become more apparent when considering the following detailed description in conjunction with the attached drawings wherein.

A space vehicle having a landing gear incorporating an energy absorbing landing pad 10 constructed in accordance with this invention is shown during its descent after a braking phase, as indicated by numeral 2, at impact with the lunar surface as indicated by numeral 4 and deployed, on the surface of the moon as indicated by numeral 6.

Figure 1:
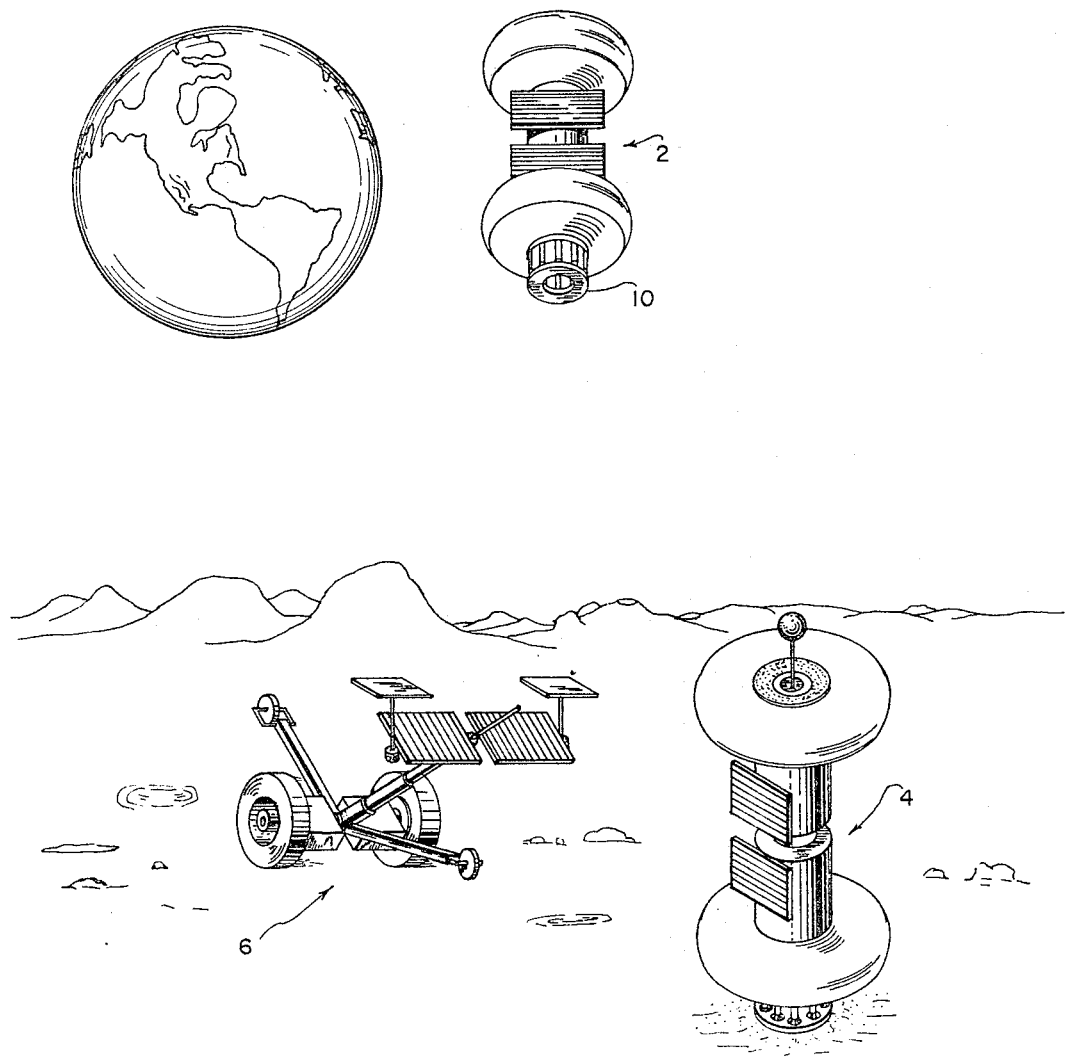
FIGURE 1 is a pictorial representation of a space vehicle employing the invention to absorb the impact load of landing. The space vehicle is shown in a landing sequence that includes free fall after a braking phase (not shown), surface impact and deployment of the space vehicle.
Figures 2, 3, 4:
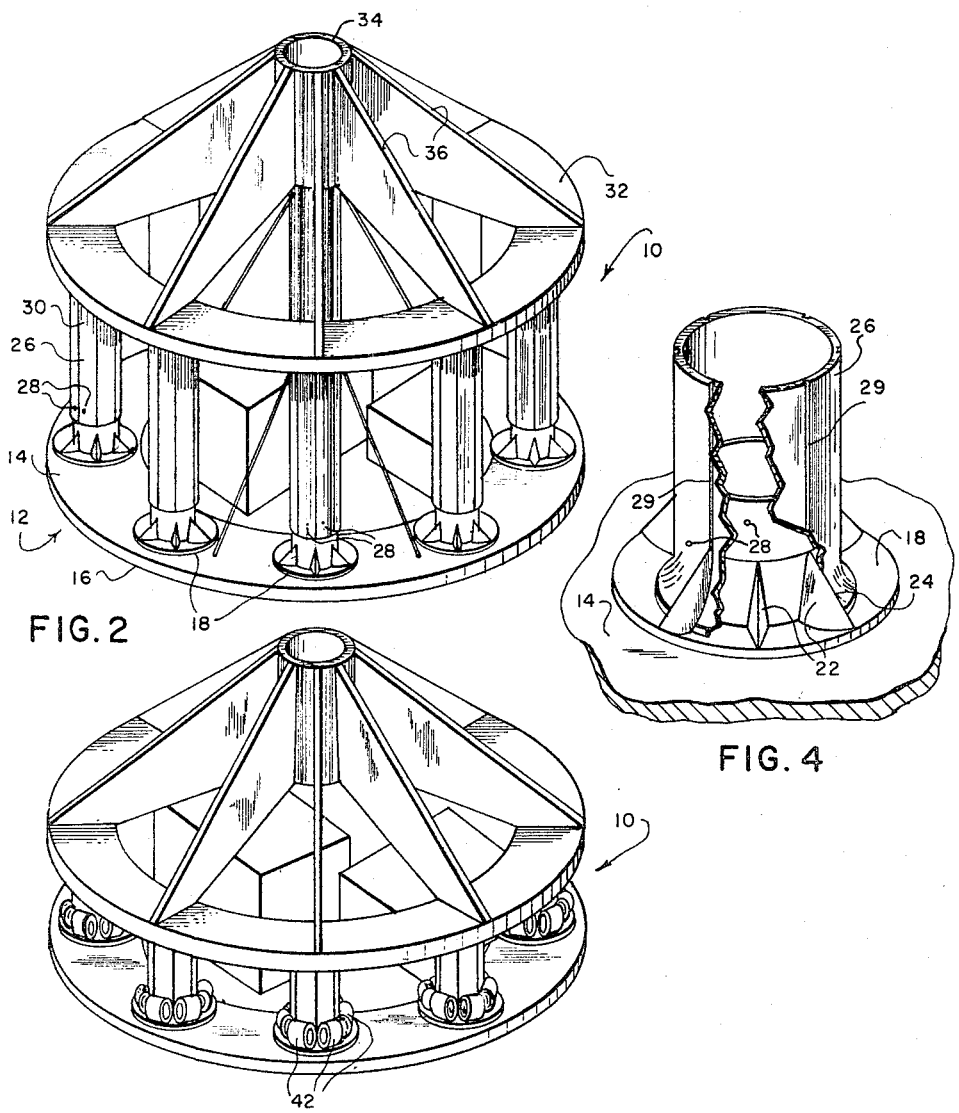
FIGURE 2 is a pictorial view of an energy absorbing device employing a plurality of deformable tubes, as it appears prior to a landing operation.
FIGURE 3 is a view similar to FIGURE 2 except that the device is illustrated after a landing operation in a collapsed position.
FIGURE 4 is a broken away and enlarged view illustrating the manner in which the tubular member is engaged by the cutting members.

Landing pad 10, as illustrated in FIGURES 2 and 3 consists of a lower support ring 12 having an upper surface 14 and a lower surface 16. A plurality of annular, recesses 18 are formed in the upper surface of the lower support ring. Each recess 18 has a tubular guide member 20 extending upwardly from the center thereof. A plurality of triangular shaped cutting members 22 having cutting edges 24 are attached to said tubular guide member and the recessed surface of the lower support ring.

A cylindrical sleeve 26 has one end slidably mounted over guide member 20 so that end portion 28 thereof is adjacent to cutting member 22. Sleeve 26 has a plurality of grooves 29 milled therein that are aligned with cutting members 22. The lower support ring is maintained in a fixed position relative to cylindrical sleeve 26 by shear type pins 28, or other suitable means, mounted therein. The pins 28 would be of sufficient strength to support the weight of the vehicle under stowed conditions, but yield readily when subjected to an impact load.

Upper ends 30 of each sleeve 26 is attached to an upper ring member 32 suspended from a collar 34 by angular frame members 36.

FIGURE 3 of the drawing illustrates the landing pad in the collapsed position it will assume after a landing operation. The operation of the device is believed readily apparent from a consideration of the drawing. The inertia of the space vehicle upon landing will exert a force upon ring member 32 and thus sleeves 26. This force on sleeve 26 will shear pins 28 and drive each sleeve 26 onto its respective cutting edges 24, resulting in each sleeve 26 being cut into strips along calibration grooves 29. The shape of each annular recess 18 is such that the strips of metal formed by cutting of sleeve 26 are deformed into a number of concentric coils 42 (see FIG. 3).

An energy absorbing device constructed in accordance with the invention can be readily calibrated so as to be capable of absorbing a particular load. What can be termed as coarse adjustment is accomplished by selecting a particular wall thickness for the tube to be deformed and a desired spacing of the longitudinal grooves in the walls of the tube. This obviously controls the size of the strips that are formed into coils and thus the amount of energy dissipated in forming the coils. A second adjustment, and what could be considered a fine adjustment, is provided by varying the depth of the longitudinal grooves along which the tube is cut and thus the energy required to cut the tube into strips.

Figure 5:
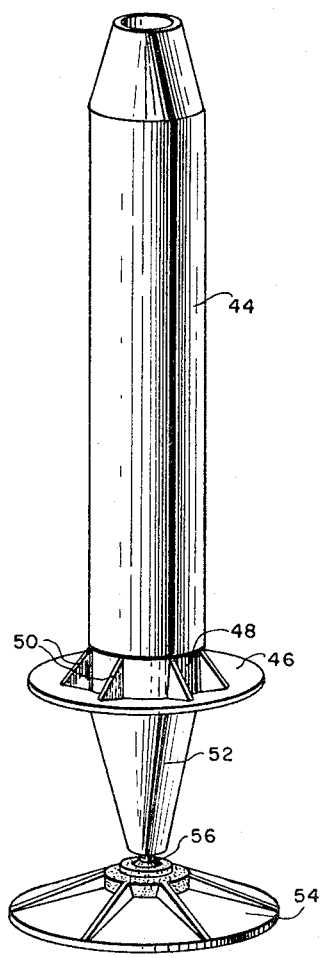
FIGURE 5 is a pictorial view of an energy absorbing device employing a single deformable tube.

An alternate embodiment is illustrated in FIGURE 5 which operates on the same principle, but employs only a single deformable sleeve 44 that is normally attached at its upper end to a landing vehicle (not shown). In a landing operation, sleeve 44 is driven into a contact plate 46 that includes a centrally disposed guide member 48 and cutting members 50 fixed thereto. Contact plate 46 includes a conical extension 52 extending downwardly therefrom that has a base plate 54 mounted thereto by means of a ball joint 56. This type of construction facilitates landing of a space vehicle at an angle or on uneven surfaces.

While a preferred exemplary embodiment and an alternate embodiment thereof has been described herein, it will be apparent to those skilled in the art to which this invention pertains that many changes and modifications may be made thereto without departing from the spirit and scope of the invention as defined in the claim appended hereto.

What is claimed is:
1. An energy absorbing device for the landing gear of a space vehicle comprising:
 a support ring member having flat upper and lower surfaces, said lower surface normally engaging a landing surface when said energy absorber is used as a landing gear;
 a plurality of spaced dish shaped recesses formed in the upper surface of said support ring;
 a tubular guide member centrally mounted in each of said dish shaped recesses and extending upwardly therefrom;
 a plurality of spaced triangular shaped cutting members mounted in each of said recesses and to the upwardly extending guide member mounted therein so as to present an upwardly oriented cutting edge at spaced intervals around the periphery of each guide member;
 a cylindrical sleeve slidably disposed over each tubular guide member, each of said cylindrical sleeves being positioned so that one end thereof is adjacent to the cutting members positioned around the periphery of each tubular guide member, the other end of each cylindrical sleeve extending upwardly away from said support ring;
 said cylindrical sleeves each having a plurality of longitudinally disposed calibration grooves formed therein that are spaced around the periphery of the cylindrical sleeve in a position of alignment with the cutting edges of the cutting members so as to influence the energy absorbing properties of the device;
 a second ring member having an upper surface and a lower surface;
 said lower surface of said second ring member having each of the other ends of said tubular sleeves attached thereto in a spaced relation, whereby application of a force to the upper surface of said second ring member will result in said cylindrical member being forced onto the cutting members and cut along the calibration grooves into strips that are formed into coils by the dish shaped recesses.

References Cited

UNITED STATES PATENTS

| | | | |
|---|---|---|---|
| 3,143,321 | 8/1964 | McGehee et al. | 188—1 X |
| 3,175,789 | 3/1965 | Blumrich | 188—1 X |
| 3,236,333 | 2/1966 | Mitchell | 188—1 |

FOREIGN PATENTS 472,071  3/1951  Canada.

DUANE A. REGER, *Primary Examiner.*